(12) United States Patent
GokulRaju

(10) Patent No.: US 10,581,972 B1
(45) Date of Patent: Mar. 3, 2020

(54) INTERNET OF THINGS (IOT) GATEWAY-BASED CARRIER-OPERATOR SIGNAGE MONITORING

(71) Applicant: Cisco Technology, Inc., San Jose, CA (US)

(72) Inventor: Venkatesh Cumbakonam GokulRaju, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/279,455

(22) Filed: Feb. 19, 2019

(51) Int. Cl.
| | | |
|---|---|---|
| *H04L 29/08* | (2006.01) | |
| *H04W 4/80* | (2018.01) | |
| *H04M 15/00* | (2006.01) | |
| *H04W 64/00* | (2009.01) | |
| *H04W 84/18* | (2009.01) | |

(52) U.S. Cl.
CPC ............ *H04L 67/12* (2013.01); *H04M 15/51* (2013.01); *H04W 4/80* (2018.02); *H04W 64/003* (2013.01); *H04W 84/18* (2013.01)

(58) Field of Classification Search
CPC ....................................... H04L 67/12
USPC ......................................... 455/405
See application file for complete search history.

(56) References Cited

U.S. PATENT DOCUMENTS

| | | |
|---|---|---|
| 9,445,396 B1 | 9/2016 | Herring et al. |
| 2010/0007498 A1 | 1/2010 | Jackson |
| 2016/0195881 A1 | 7/2016 | Britt et al. |

FOREIGN PATENT DOCUMENTS

KR 2018057476 5/2018

OTHER PUBLICATIONS

Venkatesh, C G., "Cellular Tower Analytics—Signage Monitoring", http://cgvenkateshrajulabs.com/cellular-tower-analytics-signage-monitoring/, 8 pages, 2018, C G Venkatesh.
"Tiny Bluetooth sensors so you can Make and Connect stuff", https://www.kickstarter.com/projects/guardyen/tiny-bluetooth-sensors-so-you-can-make-and-connect, 13 pages, Jan. 26, 2016., MbientLab Inc.

*Primary Examiner* — Joel Ajayi
(74) *Attorney, Agent, or Firm* — Behmke Innovation Group LLC; James Behmke; Stephen D. LeBarron

(57) ABSTRACT

In one embodiment, a technique for Internet of Things gateway-based carrier-operator signage monitoring is provided that illustratively comprises: receiving, by a gateway device and from a first device of a plurality of devices of a mesh network in a monitored site, positioning information associated with a second device of the plurality of devices, wherein each of the plurality of devices is affixed to a respective sign; generating, by the gateway device, site monitoring information by aggregating the positioning information with other positioning information received from the plurality of devices, wherein the site monitoring information indicates a physical change in placement of a sign to which the second device is affixed; and sending, by the gateway device, the site monitoring information to a signage monitoring device configured to perform a mitigation action for the monitored site based on an identification of the physical change in placement of the sign.

14 Claims, 13 Drawing Sheets

INTERNET OF THINGS (IOT) GATEWAY-BASED CARRIER-OPERATOR SIGNAGE MONITORING

TECHNICAL FIELD

The present disclosure relates generally to computer networks, and, more particularly, to Internet of Things (IoT) gateway-based carrier-operator signage monitoring.

BACKGROUND

Generally, signs found in telecommunications carrier sites may be warning signs, notice signs, caution signs, etc. that advise viewers of hazards that may be present. The signs may each convey varying information based on the proximity of the sign to a communications tower (of a telecommunications carrier site). Operators of the telecommunications carrier sites and/or communications towers may face monetary fines when sign(s) are not present or positioned incorrectly, as required by the regulatory agencies (e.g., a sign may not be located within a certain range of the tower, fallen, been damaged, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
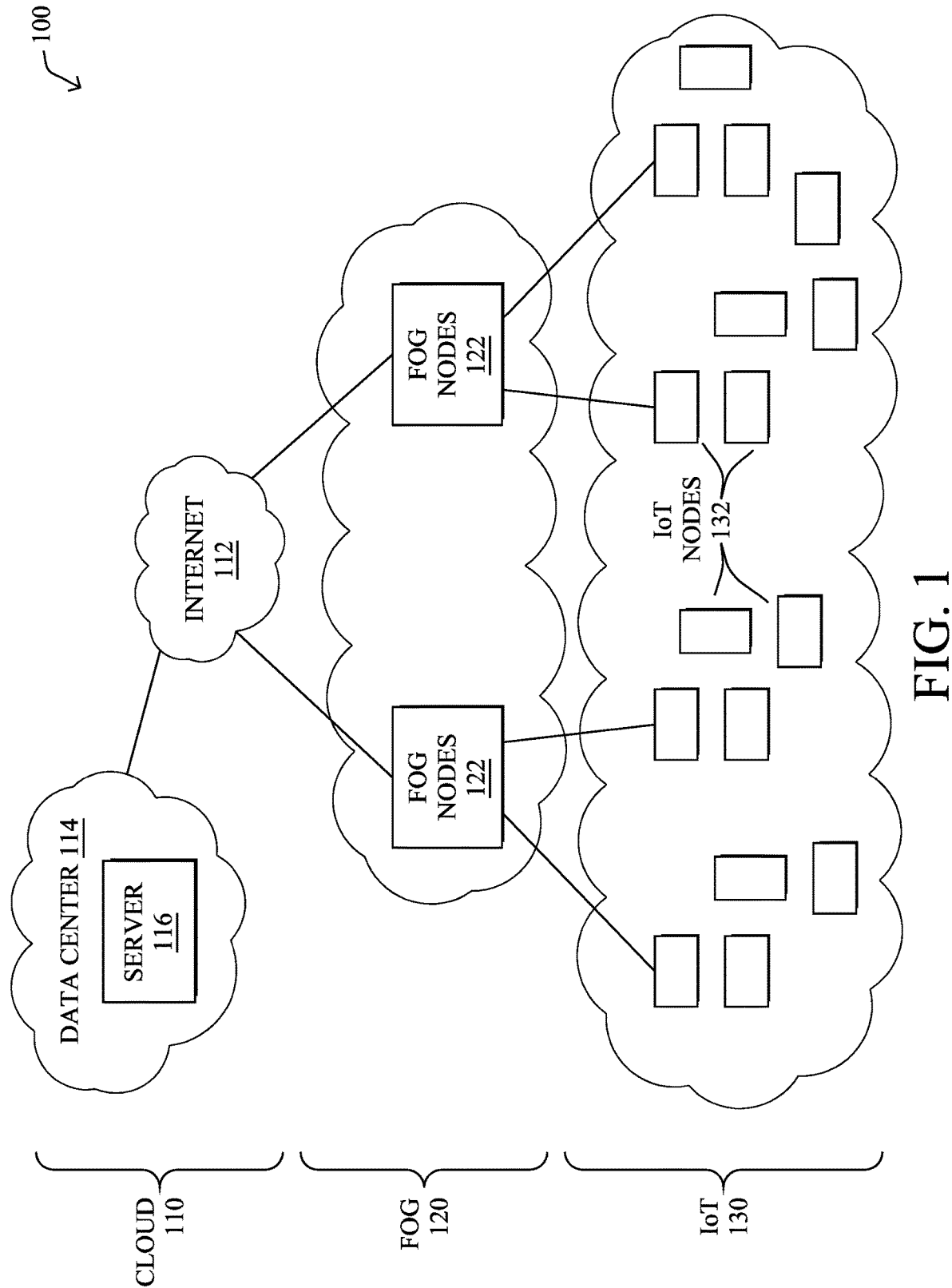
FIG. 1 illustrates an example computer network.

In one embodiment, a technique for Internet of Things (IoT) gateway-based carrier-operator signage monitoring is provided. An IoT gateway device may receive, from a first personal area network (PAN) device (e.g., a mesh Bluetooth Low Energy (MBLE) device) of a plurality of PAN devices that form a mesh network in a monitored site, positioning information associated with a second PAN device of the plurality of PAN devices. Each of the plurality of PAN devices is affixed to a respective sign. The IoT gateway device may generate site monitoring information by aggregating the positioning information with other positioning information received from the plurality of PAN devices. The site monitoring information is indicative of a physical change in placement of a sign to which the second PAN device is affixed. The IoT gateway device may send the site monitoring information to a signage monitoring device that is configured to perform a mitigation action for the monitored site based on an identification of the physical change in placement of the sign.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, high bit error rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer or hierarchy of layers from local networks (e.g., IoT networks) to the cloud (e.g., centralized and/or shared resources, as will be understood by those skilled in the art). That is, generally, fog computing entails using devices at the network edge to provide application services, including computation, networking, and storage, in close proximity to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple peer-to-peer and hierarchical layers of fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
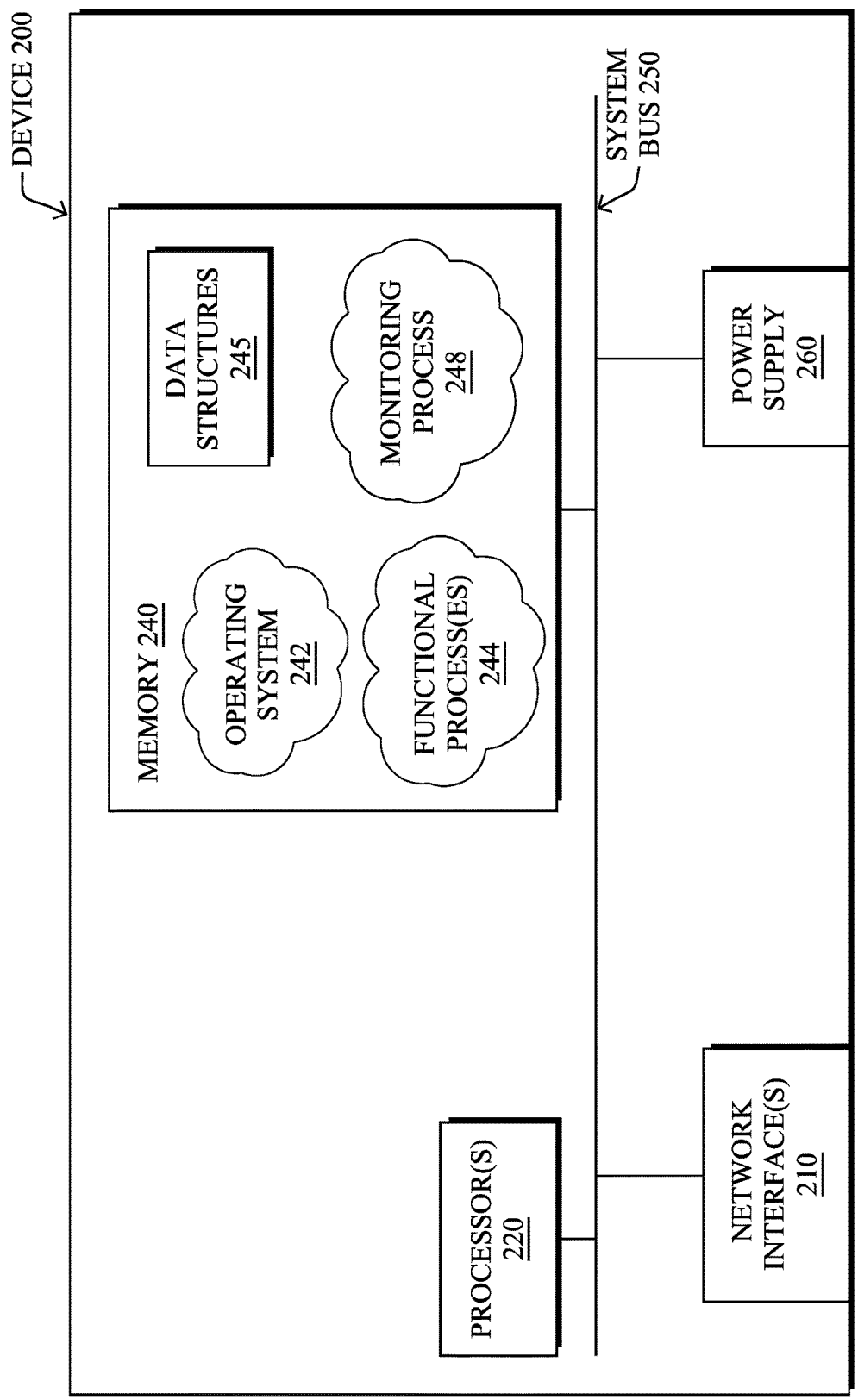
FIG. 2 illustrates an example network device/node.

FIG. 2 is a schematic block diagram of an example node/device 200 that may be used with one or more embodiments described herein, e.g., as any of the computing devices shown in FIG. 1, particularly a server 116, fog nodes 122, or any other computing device that supports the operations of techniques herein, or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, among other things, invoking network operations in support of software processors and/or services executing on the device. These software processors and/or services may comprise one or more functional processes 244 and illustratively, a monitoring process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Functional process(es) 244 may include computer executable instructions executed by processor 220 to perform one or more specific functions of the device 200, such as one or more communication protocols, routing protocols, control protocols, etc., as will be understood by those skilled in the art. For example, depending upon the type of device within the network, functional process 244 may be configured to perform specific functions corresponding to that device, such as a router performing router operations, a fog node performing fog node operations, IoT nodes performing their specifically configured functions, and so on.

—IoT Gateway-Based Carrier-Operator Signage Monitoring—

Regulatory agencies, for example, the Federal Communications Commission (FCC), have the authority to inspect telecommunications carrier sites where communications towers are installed (e.g., to ensure that safety regulations are being met). Responsibility for conducting inspections may fall on field agents of the regulatory agencies who physically visit and inspect the telecommunications carrier sites. The field agents may impose fines on the operators of the telecommunications carrier sites and/or communications towers when sign(s) at the sites are not present or positioned incorrectly, as required by the regulatory agencies (e.g., a sign may not be located within a certain range of the tower, fallen, been damaged, etc.). Generally, the signs may be warning signs, notice signs, caution signs, etc. that advise viewers of hazards that may be present in the telecommunication carrier sites. The operators (e.g., telecommunications carriers) may pay, annually, fines in the multi-million-dollar range due to signs that fail to meet requirements of the regulatory agencies. Conventionally, as per FCC guidelines, there are approximately eight to ten signs that are placed around a perimeter of a communications tower of a telecommunications carrier site. The signs may each convey varying information based on the proximity of the sign to the communications tower.

Figure 3:
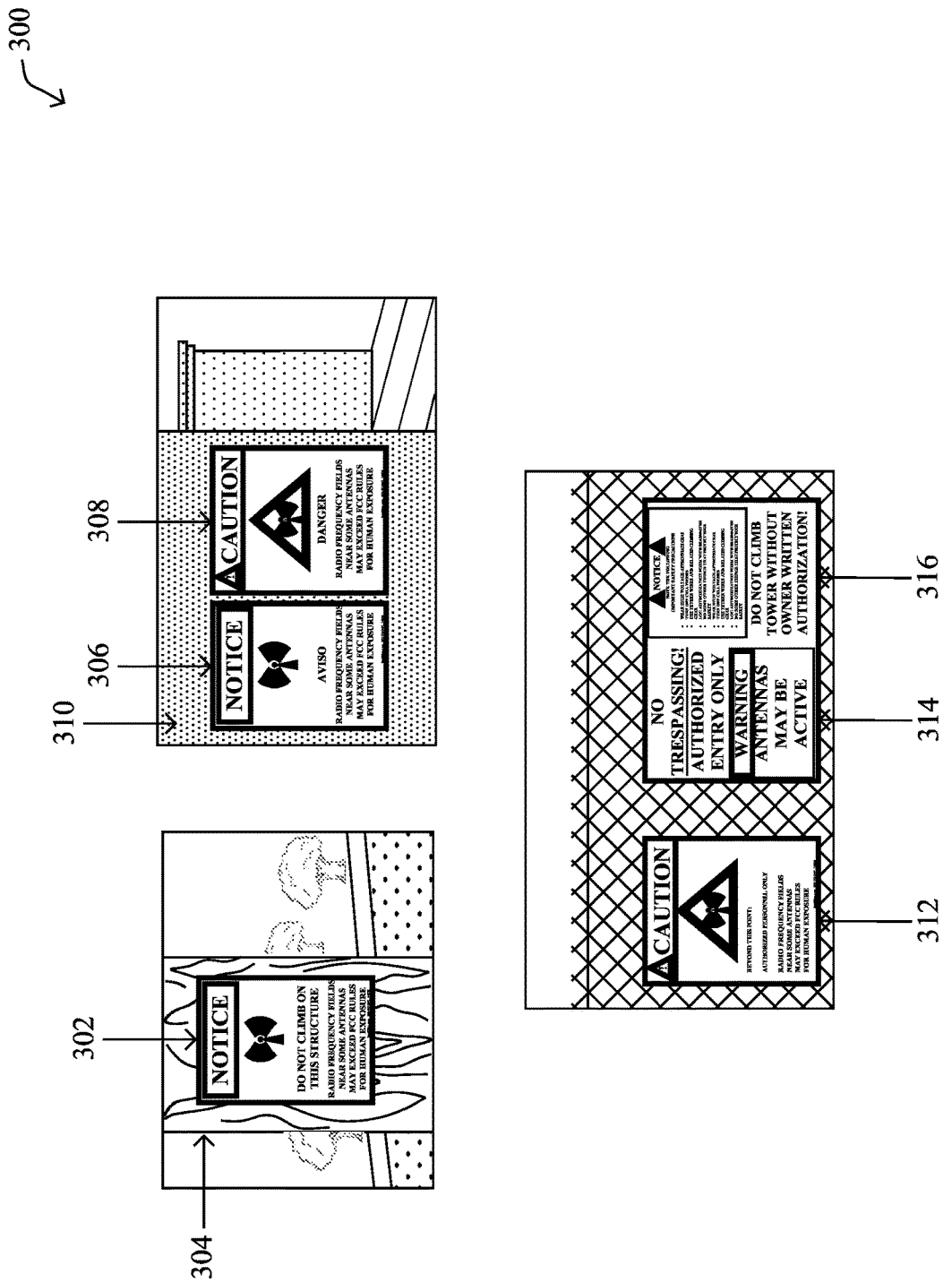
FIG. 3 illustrates example signs that may be found in telecommunication carrier sites.

With reference to FIG. 3, examples 300 of signs that may be found in telecommunications carrier sites are shown. In one example, a first notice sign 302 may be mounted to (e.g., screwed onto) a post 304 that is located near a communications tower or as a part of the communications tower itself. In another example, a first group of signs 306-308 may be posted onto an exterior wall 310 (or interior wall) of a building or physical structure located at the telecommunications carrier. In yet another example, a second group of signs 312-316 may be tied to a fence 318 (e.g., with nylon tags or building wires) that forms a perimeter around a communication tower. It is to be understood that any of these described signs may fall off due to wear and tear (e.g., weather), being climbed on by (e.g., field agents, technicians, etc.), vandalism, etc. In situations where the signs become compromised and are not remedied, regulatory agencies may impose fines on the operators of the sites where the signs are installed.

Figure 4:
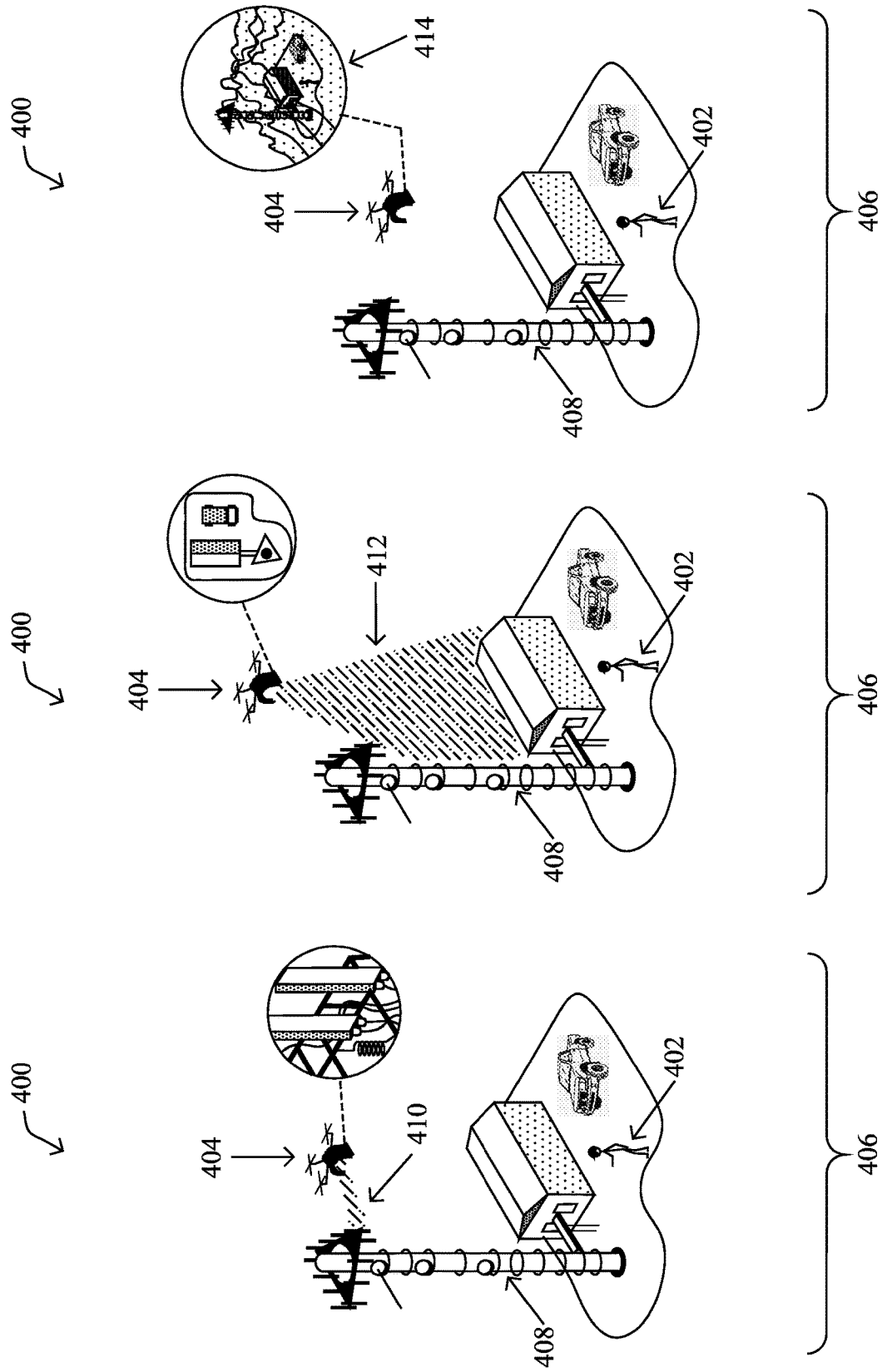
FIGS. 4A-4C illustrate a drone-based tower monitoring system.

In order to monitor signage at telecommunications carrier sites, various monitoring systems have been introduced. In particular, a drone-based tower monitoring system has been used and is shown in FIGS. 4A-4C. In FIG. 4A, in a drone-based tower monitoring system 400, a user 402 may operate a drone 404 so as to allow the user 402 to monitor signs installed in a telecommunications carrier site 406 with a communications tower 408. The system as shown in FIG. 4A presents a variety of challenges that make complete monitoring of signs installed in the communications carrier site 406 challenging. In particular, the visibility of the drone 404 may be limited to a first field of view 410 of the drone 404 that prevents the user 402 from observing signs that have, for example, structures between the signs and the drone. With reference to FIG. 4B, the visibility of the drone 404 may be limited to a second field of view 412 of the drone 404 that prevents the user 402 from observing signs that are, for example, located inside buildings. Accordingly, the user 402 is oftentimes unable to monitor each and every sign that may be installed in the telecommunications carrier site 406. In addition, and as shown in FIG. 4C, operation of the drone 404 may be impeded by weather (e.g., strong winds, inclement weather, etc.) or may be limited by flight requirements (e.g., distance from fences and/or towers, minimum and/or maximum altitudes, etc.) that limit the drone 404 to certain flight patterns 414 and/or prevent the drone 404 from being regularly operated in the drone-based tower monitoring system 400.

The user 402 in the drone-based tower monitoring system 400 may also be required to enter log entries, metrics, etc. regarding the state of the signs that are monitored by way of the drone 404 into a database (or other form of log) of a carrier (that owns and/or operates the telecommunications carrier site). The database may oftentimes not be updated regularly by the user due to the aforementioned limitations of the drone-based tower monitoring system 400. In sum, then, the drone-based tower monitoring system 400 presents significant limitations for monitoring of signs in the telecommunications monitoring site 406.

Conventional signage monitoring systems in telecommunications carrier sites, therefore, may not accurately detect signs that are not present and/or incorrectly placed within the telecommunications sites and/or notify to carriers and/or operators of any such detected issues. In particular, conventional signage monitoring systems may not be able to monitor all signs in a telecommunications carrier site (e.g. due to structures limiting fields of view, range limitations, etc.), fully operate in limited weather conditions, etc. In situations where non-present and/or incorrectly placed signs are not corrected, intended viewers of the sign may not be adequately warned of hazards in the telecommunication carrier sites. Further, the carriers and/or operators may be subject to significant fines by regulatory agencies like the FCC.

To address signage monitoring, the techniques herein establish a new mechanism for an Internet of Things (IoT) gateway-based carrier-operator signage monitoring system. Notably, the IoT gateway-based carrier operator signage monitoring system implements personal area network (PAN) devices, or more particularly, mesh Bluetooth Low Energy (MBLE) devices, that are affixed to tracked signs in a telecommunications carrier site and communicate with one another over a mesh network. The MBLE devices may be configured to, in real-time, detect and identify its own location, and thus a location of a sign to which the MBLE device is affixed. In particular, the MBLE devices may detect when the sign undergone a physical change in placement (e.g., the sign has been moved, altered, etc.). Further, the MBLE devices may be configured to communicate with one another and to relay information associated with placement of the sign, position information, etc. (from other MBLE devices) to an IoT gateway, thereby extending the range of monitoring ability for a monitored site. The IoT gateway may be configured to aggregate the information and to send the information to a destination that can cause a mitigation of the incorrectly placed sign(s). By enabling communication between the MBLE devices, which each report on information of a respective sign, the IoT gateway-based carrier operator signage monitoring system may provide deeper insight regarding all the state of signs in a telecommunications carrier site (e.g., analytics regarding a tower in the site) and enables real-time information gathering regarding the state of the signs.

Specifically, according to one or more embodiments of the disclosure as described in detail below, an IoT gateway device may receive, from a first personal area network (PAN) device (e.g., a mesh Bluetooth Low Energy (MBLE) device) of a plurality of PAN devices that form a mesh network in a monitored site, positioning information associated with a second PAN device of the plurality of PAN devices. Each of the plurality of PAN devices is affixed to a respective sign. The IoT gateway device may generate site monitoring information by aggregating the positioning information with other positioning information received from the plurality of PAN devices. The site monitoring information is indicative of a physical change in placement of a sign to which the second PAN device is affixed. The IoT gateway device may send the site monitoring information to a signage monitoring device that is configured to perform a mitigation action for the monitored site based on an identification of the physical change in placement of the sign.

Illustratively, the techniques described herein may be performed by hardware, software, and/or firmware, such as in accordance with the monitoring process 248, which may include computer executable instructions executed by the processor 220 (or independent processor of interfaces 210) to perform functions relating to the techniques described herein, on either or both of the MBLE devices or the IoT gateway device, as detailed below.

Figure 5:
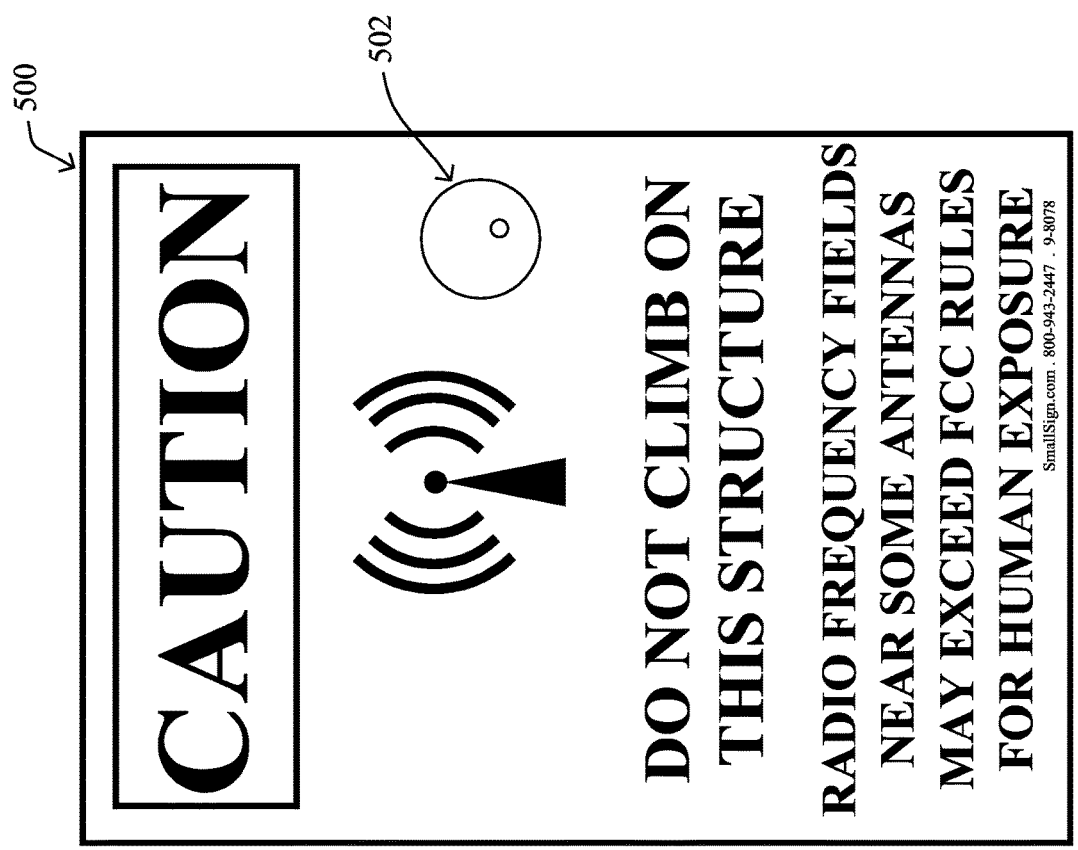
FIG. 5 illustrates a simplified example sign of a telecommunications carrier site with a personal area network (PAN) device affixed to the sign.

Operationally, FIG. 5 illustrates a simplified example of sign 500 of a telecommunications carrier site with an MBLE device 502 affixed to the sign. In particular, the MBLE device 502 may be in a compact form factor sensor "dot" that has a physical background and/or base color properties that avoids visual readout interference with the sign 500, and may be placed on the front or back of the sign. The sign 500 may be a danger sign, a caution sign, a registration number plate, and/or a notice sign. In an example, the MBLE device 502 may be in the same color as the sign 500. The MBLE device 502 may also be weather-proof, for example, IP67, IP68, etc. compliant. Further, the MBLE device 502 may be affixed (or bonded) to the sign 500 using a bonding base with an instant bonding threshold (e.g., with heat shrinkable sleeve bonding). The MBLE device 502 may comprise the example node/device 200 that includes hardware and/or software that allows that MBLE device 502 with other MBLE devices using suitable communication protocols, such as Bluetooth Low Energy (BLE).

The MBLE device 502 may include sensor hardware and/or software that allows the MBLE device 502 to determine a location of the sign 500 and/or whether the sign 500 (to which the MBLE device 502 is affixed) has undergone a physical change in placement (e.g., the sign 500 has been moved, altered, etc.). In other words, the MBLE device 502 may determine that exact installed presence and/or position of the sign 500. As examples, the MBLE device 502 may include a tilt sensor, an inclinometer, a dust sensor, and a vibration sensor. Such sensors may be used to determine changes to a tilt angles, fallen position states, accumulated-dust intensity levels, or vibration levels of the sign. In more sophisticated embodiments, global positioning satellite (GPS) technology may also be used on the devices for precise location monitoring. While the MBLE device 502 is described as using BLE, other low energy PAN protocols may be used that are known in the art, for example, Zigbee, Z-Wave, 6LoWPAN, etc. Low energy protocols are well-suited for the techniques described herein due to the low energy requirements of the (e.g., BLE) that ensure that devices do not drain energy sources (e.g., batteries) and may operate for extended periods of time.

Figure 6A:
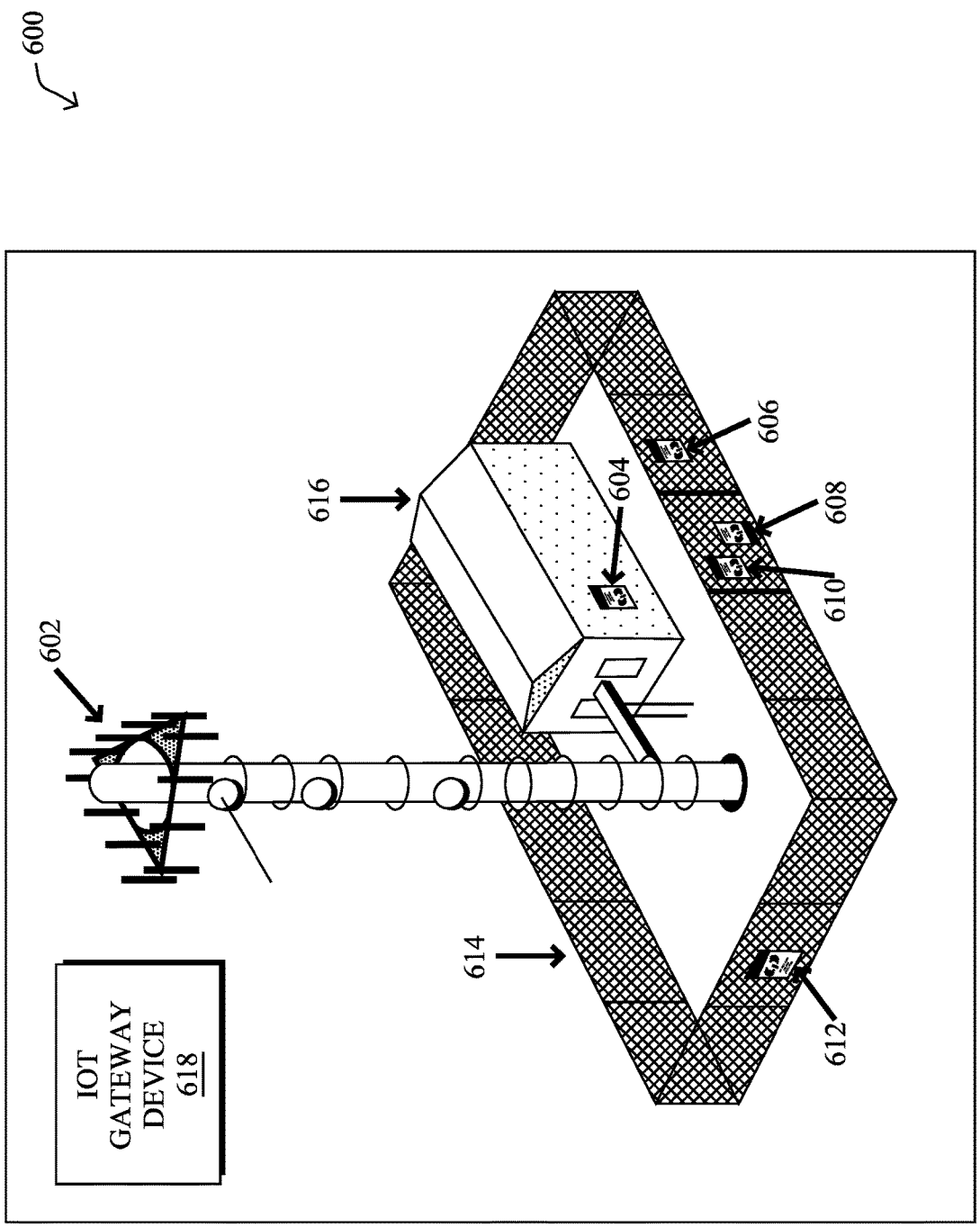
FIGS. 6A-6B illustrate a simplified example of a telecommunications carrier site that includes an Internet of Things (IoT) gateway-based carrier operator signage monitoring system.
Figure 6B:
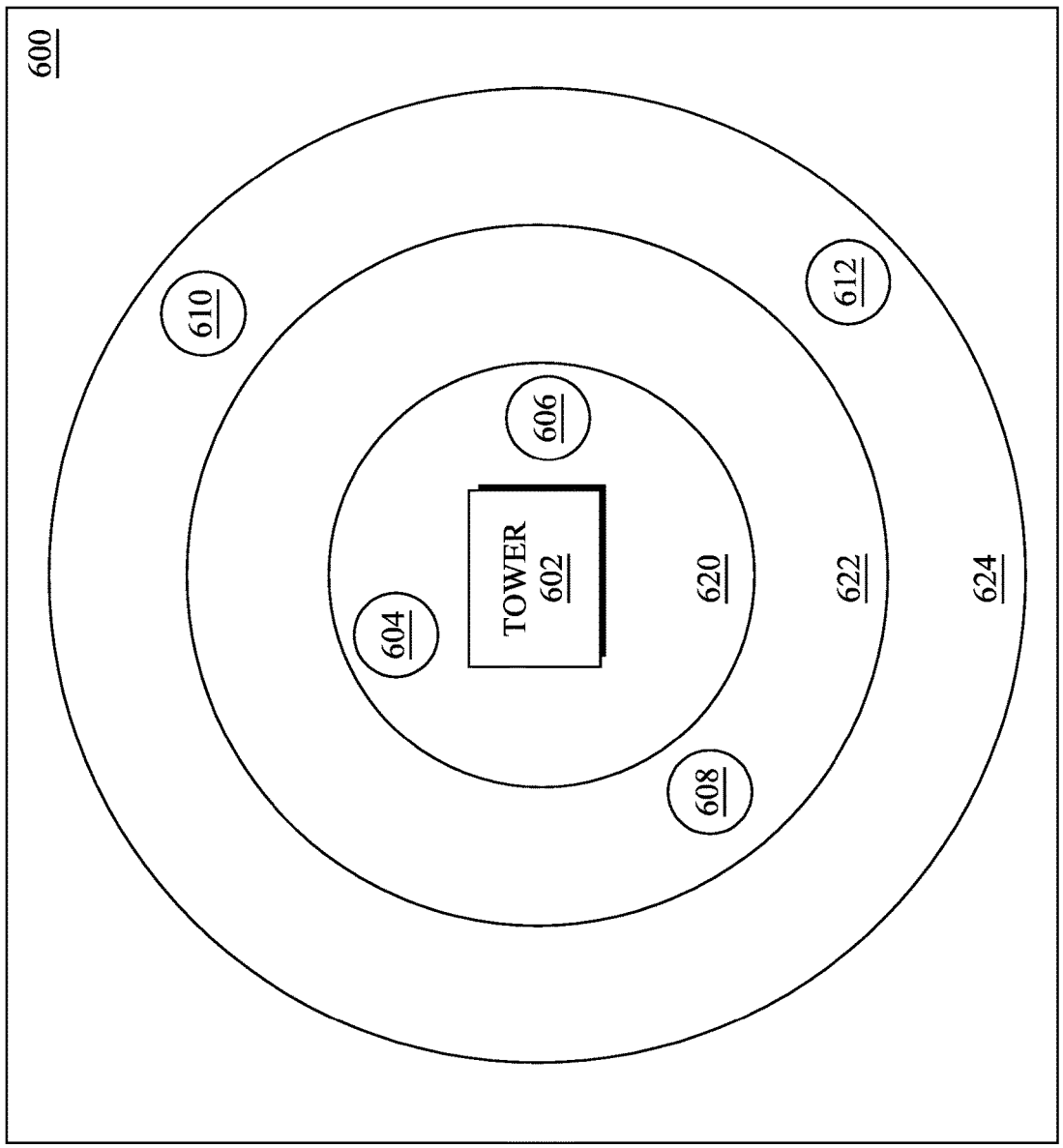

FIGS. 6A-6B illustrate a simplified example of telecommunications carrier site that includes an IoT gateway-based carrier operator signage monitoring system. Turning to FIG. 6A, a telecommunications carrier site 600 may include a communications tower 602 that may cause hazardous conditions in and/or around the site 600. Further, the telecommunications carrier site 600 may include a plurality of MBLE devices 604-612 that may be affixed to respective signs which are placed on a fence 614 and/or a building wall 616. Each of the plurality of MBLE devices 604-612, as will be described in greater detail herein, may be configured to report information regarding the placement, condition, etc. of sign to which a respective MBLE device is affixed to an IoT gateway device 618.

With reference now to FIG. 6B, a top-down view of the telecommunications carrier site 600 is shown. In particular, the telecommunications carrier site 600 may include signs (with respective MBLE devices 604-612) placed in perimeters and/or zones in relation to the communications tower 602. Signs with MBLE nodes 604-606 may be in a first perimeter 620 that is relatively close to radio antennas and/or heads of the communications tower 602. Generally, signs in the first perimeter 620 are danger signs and/or warning signs that caution viewers against being in close proximity to the sign (or the telecommunications tower 602) since individuals may experience, for example, radiofrequency (RF) burns. As shown, a sign with MBLE node 608 may be located in a second perimeter 622, where signs in the second perimeter are generally caution signs. The caution signs generally indicate to individuals (e.g., service personnel) to adhere to proper handling of cellular equipment, that the entire telecommunications site 600 does not need by shut down during an antenna interlock sequence, etc. The caution signs may also indicate that the individuals should not be within the second perimeter 622 for a long amount of time. In addition, signs with MBLE nodes 610-612 may be located in a third perimeter 624. Signs in the third perimeter 624 may include FCC registration number plates, indications of RF radiation range of the communications tower 602, miscellaneous caution and/or notice signage, standard telecommunications signage, etc. Additionally, in situations where the telecommunications carrier site 600 is in close proximity to recreational parks, recreational centers, and/or utility centers, the signs may be additional warning signs (that indicate that the communications tower 602 is close by).

Figure 7A:
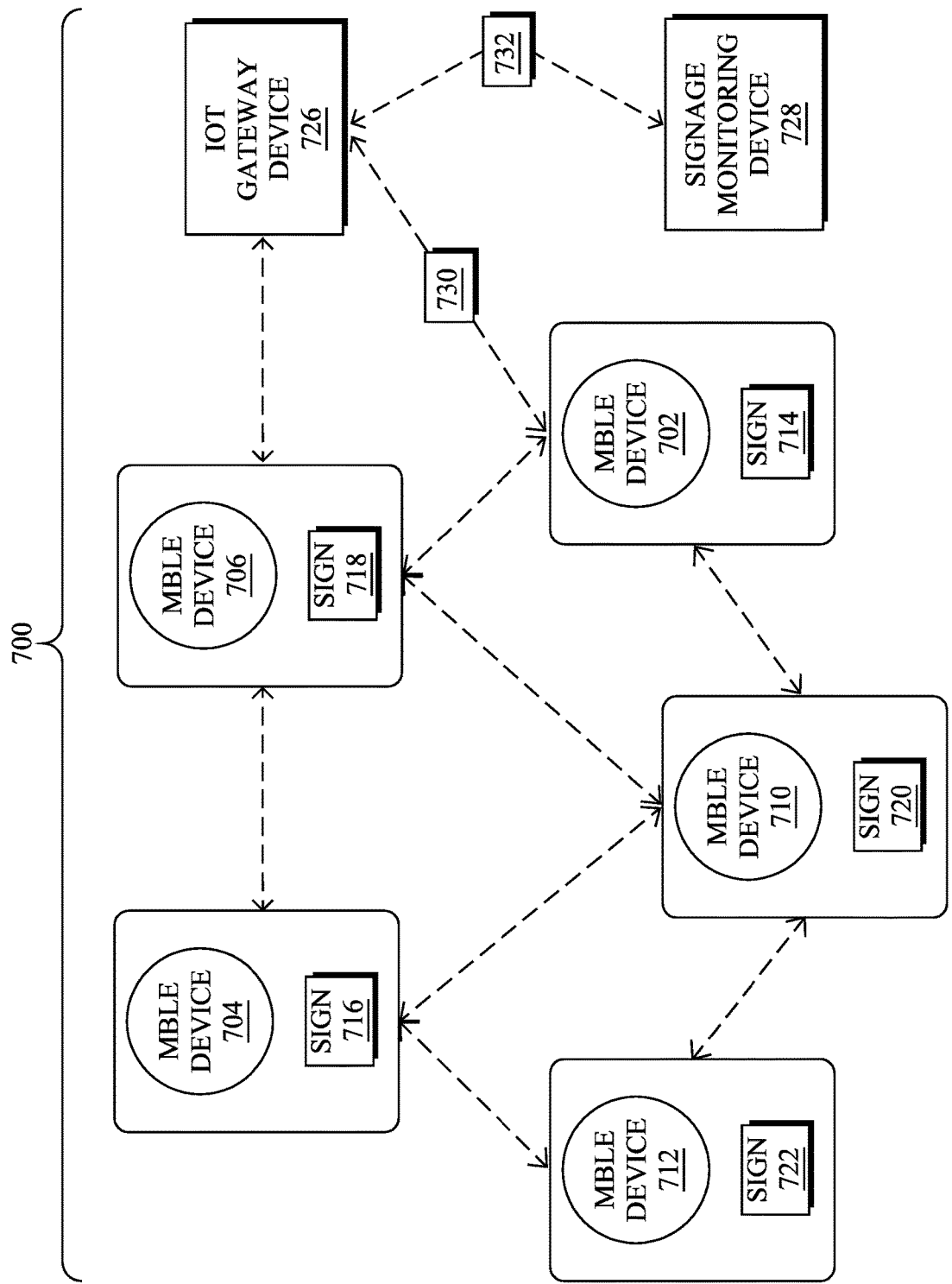
FIGS. 7A-7B illustrate a simplified example communications architecture of an IoT gateway-based carrier operator signage monitoring system.
Figure 7B:
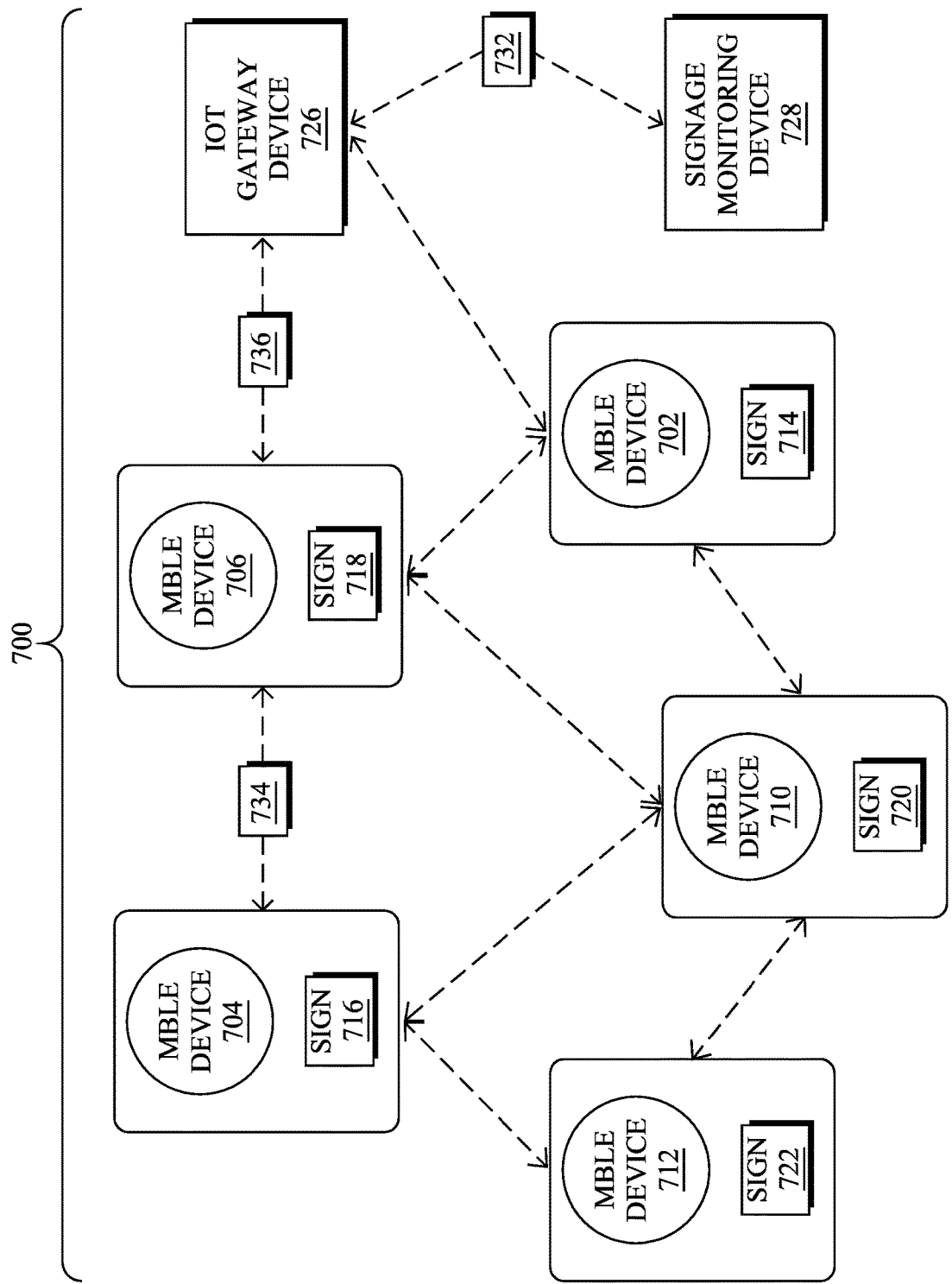

Turning to FIGS. 7A-7B, an example communications architecture of an IoT gateway-based carrier operator signage monitoring system is shown. In FIG. 7A, a telecommunications carrier site 700 may include a plurality of MBLE devices 702-712 that are affixed to respective signs 714-24. The MBLE devices 702-712 may be communicative with one another over a mesh network, for example, according to the Bluetooth Low Energy (BLE) protocol. Further, the telecommunications carrier site 700 may include an IoT gateway device 726 that includes hardware and/or software that enables the IoT gateway device 726 to communicate with in-range MBLE devices over the mesh network. Further, the IoT gateway device 726 may include hardware and/or software that enables communications between the IoT gateway device 726 and a signage monitoring device 728 (e.g., over a backhaul communications channel like cellular/long-term evolution (LTE)). The signage monitoring device 728 may be located off-site from the telecommunications carrier site 700.

In the example shown in FIG. 7A, a first MBLE device 702 that is affixed to a sign 714 may generate first positioning information indicative of the position of the sign 714, where the positioning information may indicate that a physical change in placement of the sign 714 has occurred. The first MBLE device 702 may be configured to send the first positioning information in a first message 730 (e.g., in a BLE payload) directly to the IoT gateway device 726. Specifically, the first positioning information may include a geolocation of the first MBLE device, a perimeter zone of the first MBLE device, a distance from the first MBLE device to a communications tower, and a cell lifetime of the first MBLE device. The IoT gateway 726 may be configured to aggregate the first message 730 with other messages (that include position information from the other MBLE devices) and send the aggregated messages as site monitoring information 732 to the signage monitoring device 728.

Turning to FIG. 7B, a second MBLE device 704 that is affixed to a sign 716 may generate second positioning information (that is similar to the first positioning information) indicative of the position of the sign 716. The second MBLE device 716 may not be in range of the IoT gateway device 726. The second MBLE device 704 may be configured to send the second positioning information in a second message 734 to a third MBLE device 706 that is in range of the second MBLE device 704 and the IoT gateway device 726. The third MBLE device 706, which may on its own generate positioning information regarding a sign 718 to which it is affixed, may be configured to send the second positioning information in a third message 736 to the IoT gateway device 726. The IoT gateway 726 may be configured to aggregate the third message 736 with other messages (that include position information from the other MBLE devices) and send the aggregated messages as site monitoring information 732 to the signage monitoring device 728.

Stated in another way, the third MBLE device 706, as an intermediary device, may relay data (e.g., the position information) to the remaining MBLE devices and the IoT gateway device 726, thereby allowing multiple paths for connectivity between the second MBLE device 716 and the IoT gateway device 726. The multiple paths for connectivity extend communication ranges of the plurality of MBLE devices 702-712. As an example, MBLE devices may communication positioning information regarding signs to which the devices are affixed to the (out-of-range) IoT gateway device 726 even when the MBLE devices are not in scanning range of the IoT gateway device 726. This may be implemented using advertising and/or scanning according to the BLE protocol to implement flood routing in the mesh network to which the plurality of MBLE devices are connected. Specifically, the plurality of MBLE devices 702-712 may support a mechanism known as "friendship", which allows low power nodes to periodically wake up from sleep and check for messages. Relay nodes (e.g., MBLE devices) within the network retransmit received network messages so a message can be received multiple hops away from its source.

In an example, an MBLE device may communicate messages (including positioning information) to other MBLE devices in the mesh network up to 15 hops away, thereby exponentially increasing the range of the MBLE devices to over 1500 feet. This range is well-suited for the distributed signage present at, for example, the telecommunications carrier site 700.

It is to be understood that the messages 730-734 may be are encrypted and/or authenticated. Further, the encryption and/or authentication for communication among the MBLE devices 702-712 may use different keys than the encryption and/or authentication for communication between the MBLE devices 702-712 and the IoT gateway device 726.

In addition, returning to FIGS. 4A-4C, in one embodiment, the third MBLE device 706 may comprise the drone 404, where the drone 404 enables the multiple paths for connectivity or generation of new paths, as described above. In such embodiments the drone 404 may extend communication range(s) among the plurality of MBLE devices and/or temporarily repairs broken path(s) for connectivity.

Figure 8A:
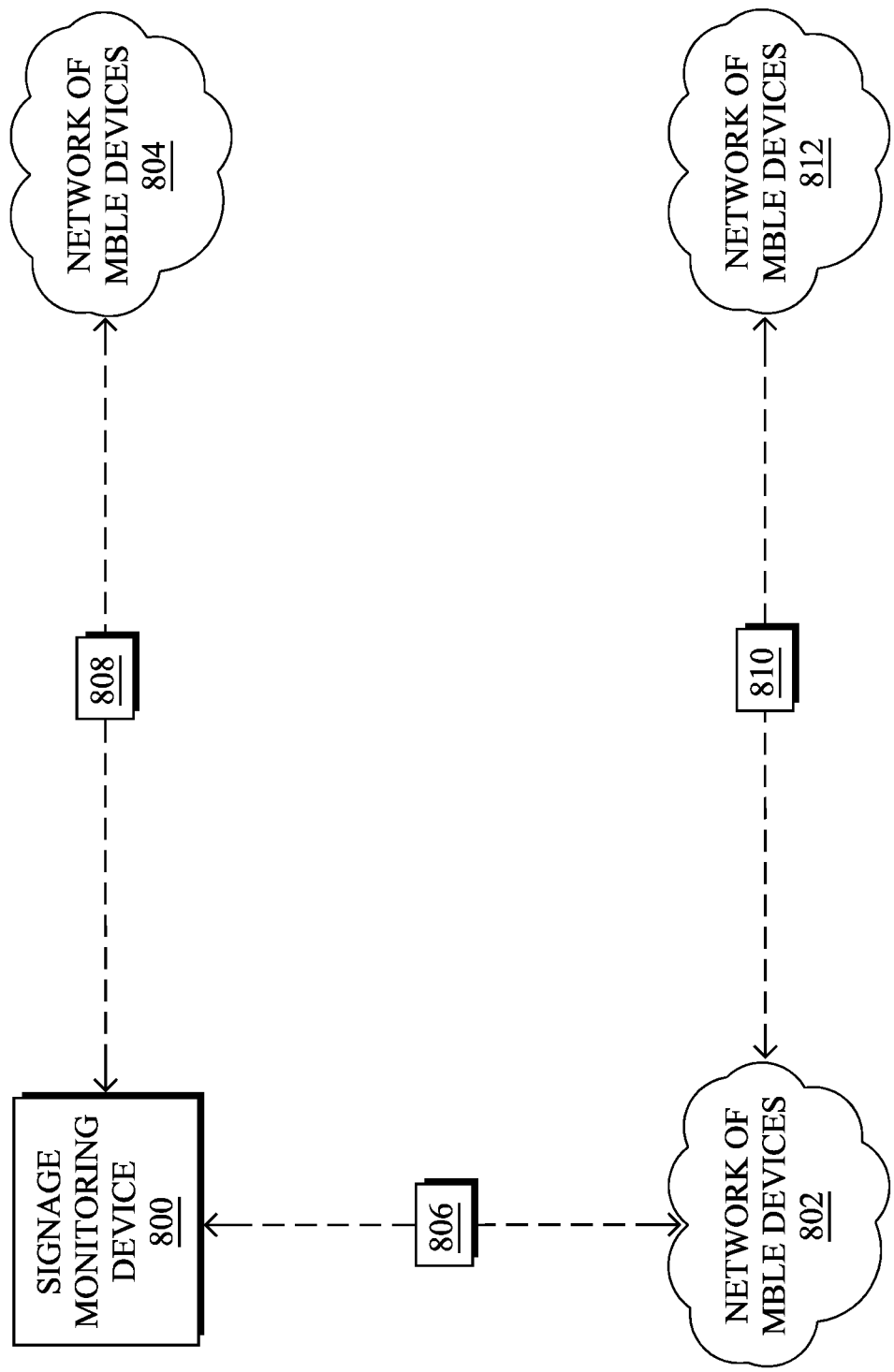
FIGS. 8A-8C illustrate a simplified example signage monitoring device.
Figure 8B:
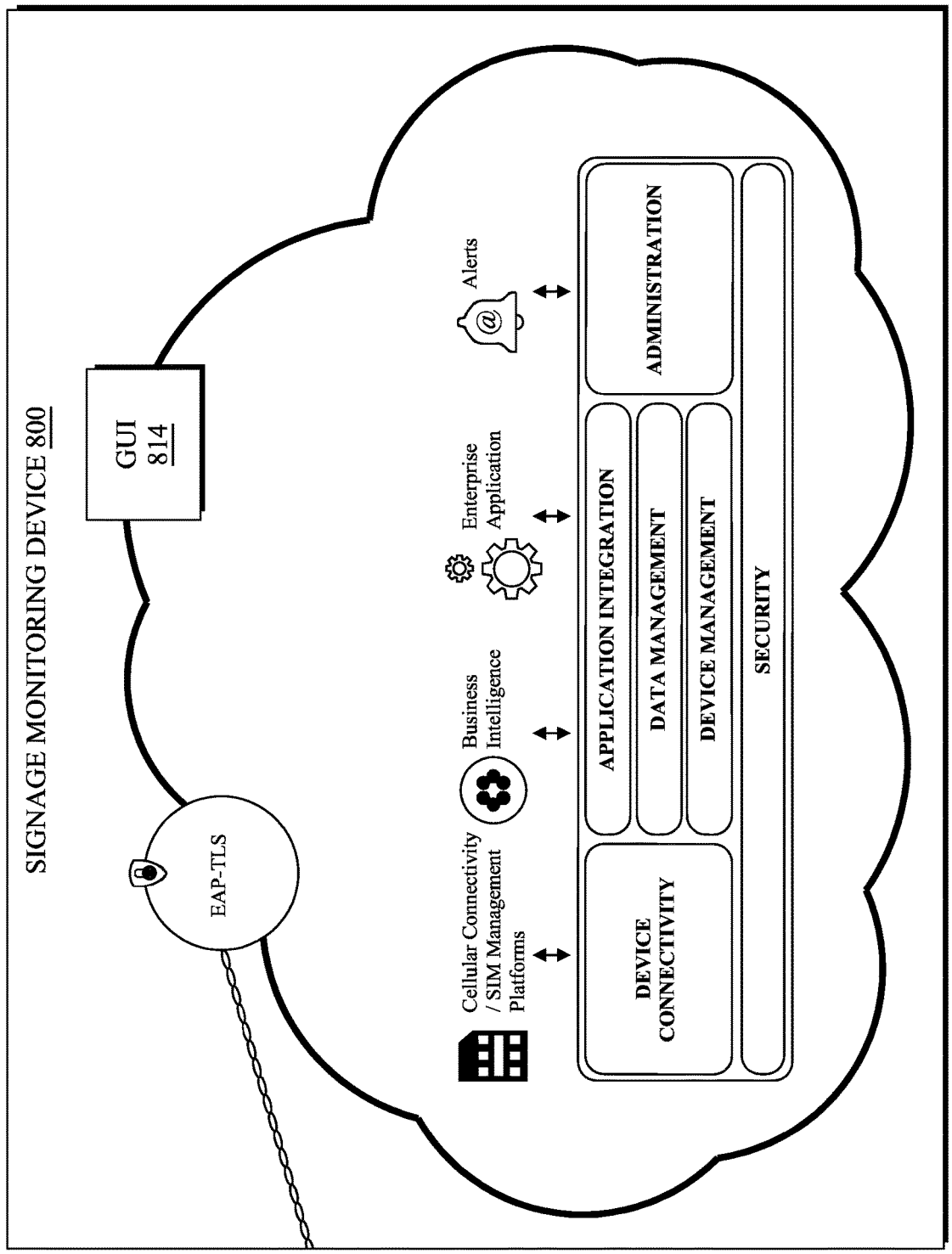
Figure 8C:
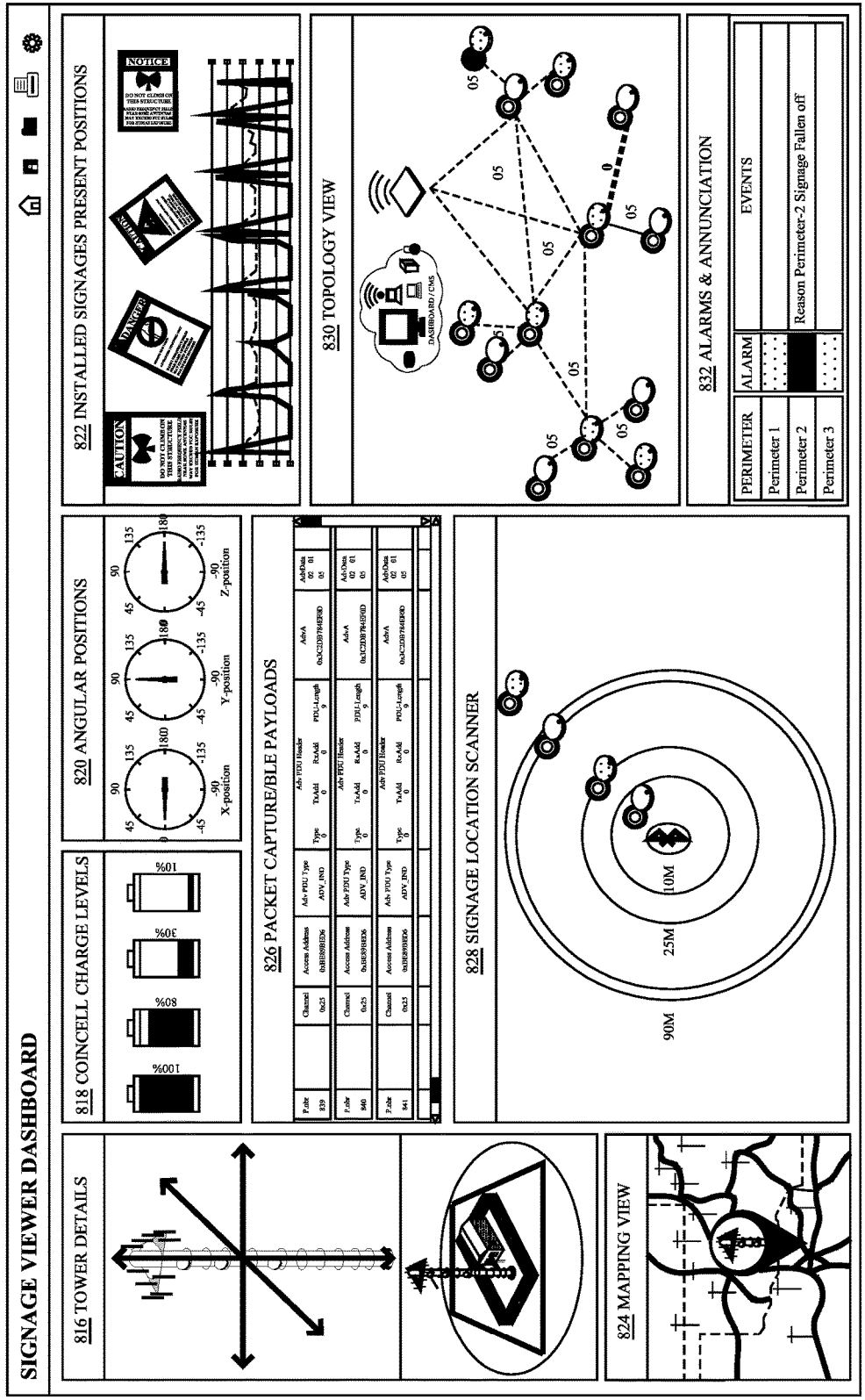

With reference to FIGS. 8A-8C an example signage monitoring device is illustrated. In FIG. 8A, a signage monitoring device 800 may be configured to communicate with a first network of MBLE devices 802 (of a first telecommunications carrier site) and a second network of MBLE devices 804 (of a second telecommunications carrier site). The signage monitoring device 800 may be configured to receive and aggregate signage monitoring information 806-808 a respective network of MBLE devices, where the signage monitoring information includes messages that are indicative of positioning information for signs to which MBLE devices are affixed.

Further, as shown, the first network of MBLE devices 802 may receive signage monitoring information 810 from a third network of MBLE devices 812 (of a third telecommunications carrier site) over, for example, a backhaul communication channel (e.g., between IoT gateway devices of, respectively, the first telecommunications site and the third telecommunications carrier site).

Turning to FIG. 8B, the signage monitoring device 800 may be configured to aggregate and generate servicing quality metrics regarding each of the telecommunication carrier sites. As examples, the signage monitoring device may gather IoT gateway logs that includes service history details of respective telecommunications carrier sites, signage modifications and/or changes to signs, etc. In a more specific example, the signage monitoring device 800 may be configured to identify whether a physical change in a placement of a sign has occurred in a telecommunications site (using the site monitoring information). In addition, the signage monitoring device 800 may be configured to a mitigation action for the monitored site based on the identification of the physical change in placement of the sign. The signage monitoring device 800 may be configured to generate a graphical user interface (GUI) 814 that displays, for example, the mitigation action.

Turning to FIG. 8C, an example GUI of generated by the signage monitoring device 800 is shown. In particular, the GUI 814 may include information that is generated using received signage information, including: 1) profiling details of select MBLE devices, 2) communications tower details, 3) mapping pinouts, 4) proximity information of an MBLE device to an IoT gateway and/or a communications tower, 4) MBLE RF pathways, 5) link-flaps and convergence details, 6) RF work-volume scanned grid and signage locations, 8) perimeter visibility, 9) alarm and/alert (and category information), 10) MBLE fencing, 11) angular positions of signs and/or fences, metal pillars, doors, etc., 12) timestamps of sensed dated by MBLE devices (e.g., vibration, swing, tilt, etc.), 13) MBLE packet capture, 14) IoT gateway provisioning, 15) MBLE profile updating, 16) MBLE firmware updating, 17) addressing schema, 17) link quality monitoring, 19) set/rest MBLE payload packet coloring filter knobs, 20) a diagnostic prober that enables monitoring of end-to-end flows (e.g., between the signage monitoring device 800 and an MBLE device), and so on.

As shown, the GUI 814 may include tower details 816, charge levels 818, angular positions 820, present positions of signs 822, a mapping view 824, payload information 826, a signage location scanner 828, a topology view 830, alarms 832, and any other pertinent information.

Figure 9:
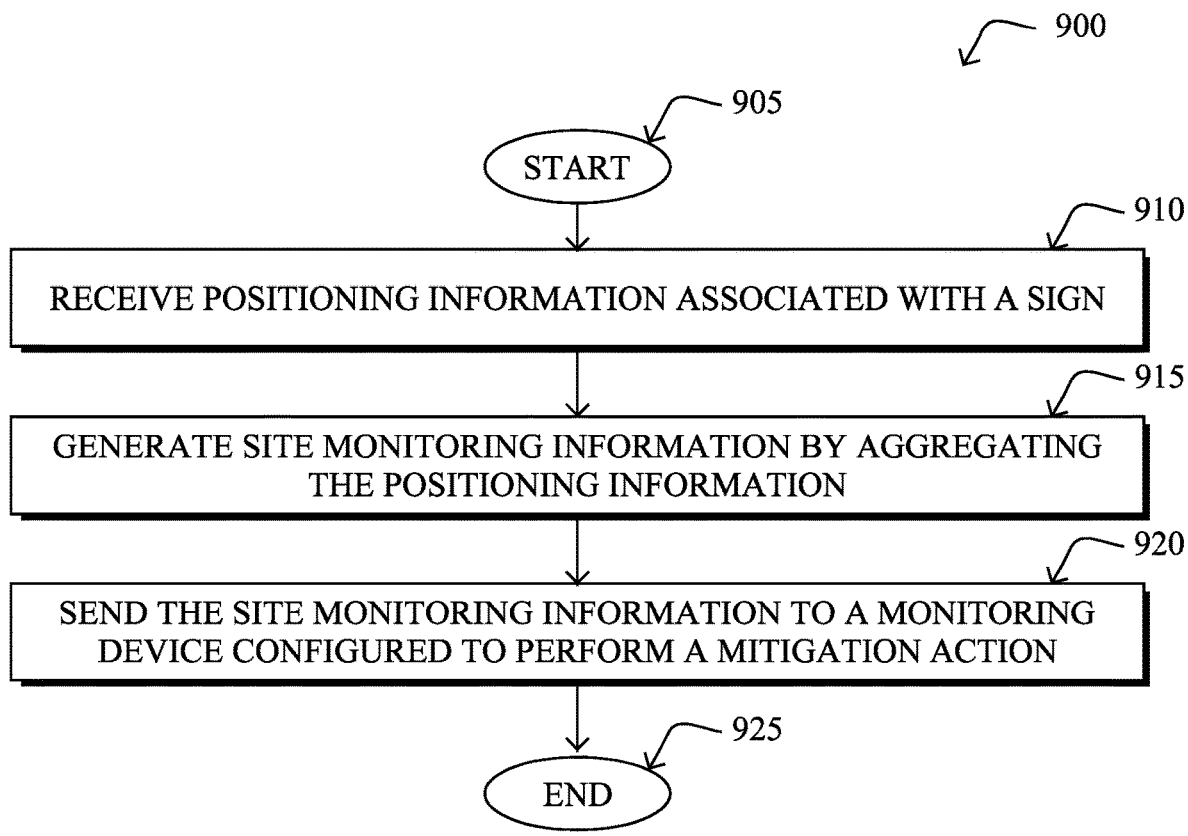
FIG. 9 illustrates an example simplified procedure for IoT gateway-based carrier-operator signage monitoring.

FIG. 9 illustrates an example simplified procedure for IoT gateway-based carrier-operator signage monitoring, in accordance with one or more embodiments described herein. For example, a non-generic, specifically configured device (e.g., device 200, an apparatus, etc.) may perform procedure 900 by executing stored instructions (e.g., process 248). The procedure 900 may start at step 905, and continues to step 910, where, as described in greater detail above, an IoT gateway device receives positioning information associated with a sign. In particular, the IoT gateway device may receive, from a first PAN device (e.g., a MBLE device) of a plurality of PAN devices (e.g., MBLE devices) that form a mesh network in a monitored site, positioning information associated with a second PAN device of the plurality of PAN devices, wherein each of the plurality of PAN devices is affixed to a respective sign. In one embodiment, each of the plurality of PAN devices may be a sensor dot that is affixed to the respective sign using a bonding base with an instant bonding threshold. Also, PAN devices may be include at least one sensor used to generate the positioning information, such as a tilt sensor, an inclinometer, a dust sensor, a vibration sensor, a GPS sensor, etc.

As mentioned above, the monitored site may be a telecommunications carrier site that includes a communications tower, where the communications tower operated by a telecommunications carrier. The first PAN device may receive the positioning information over one or more hops across the mesh network from an intermediary PAN device of the plurality of PAN devices. Further, the second PAN device may not be in direct communication range of the IoT gateway device. Moreover, the positioning information may include information that is selected from the group consisting of: a geolocation of the second PAN device, a perimeter zone of the second PAN device, a distance from the second PAN device to a communications tower, a cell lifetime of the second PAN device, etc.

At step 915, as described in greater detail above, the IoT gateway device may generate site monitoring information by aggregating the positioning information. In particular, the IoT gateway device may generate site monitoring information by aggregating the positioning information with other positioning information received from the plurality of PAN devices, wherein the site monitoring information is indicative of a physical change in placement of a sign to which the second PAN device is affixed. The site monitoring information may be indicative of a signage type of the sign, further wherein the signage monitoring device is configured to perform the mitigation action based on the signage type. The signage type may be selected from the group consisting of: a danger sign, a caution sign, a registration number plate, a notice sign, and so on.

At step 920, the IoT gateway device may send the site monitoring information to a monitoring device configured to perform a mitigation action. In particular, the IoT gateway device may send the site monitoring information to a signage monitoring device that is configured to perform a mitigation action for the monitored site based on an identification of the physical change in placement of the sign.

The simplified example procedure 900 then ends at step 925.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for IoT gateway-based carrier-operator signage monitoring. By affixing PAN devices to signs at telecommunications carrier sites, complete monitoring of each sign of the signs is enabled, particularly, signs that may not necessarily be in fields of view of human and/or drone-based monitors (e.g., blocked by structures). Using PAN devices allows messages (that include positioning information generated by the PAN devices based on sensed physical changes in placements of a sign) to be directly sent and/or relayed (e.g., over one or more hops in a mesh network) to an IoT gateway. The IoT gateway may then send site monitoring information to a signage monitoring device that is configured to perform a mitigation action for the monitored site based on an identification of the physical change in placement of the sign.

While there have been shown and described illustrative embodiments that provide IoT gateway-based carrier-operator signage monitoring, it is to be understood that various other adaptations and modifications may be made within the intention and scope of the embodiments herein. For example, while certain protocols and messaging formats are shown, such as Bluetooth, BLE, etc., other suitable protocols and formats may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intention and scope of the embodiments herein.

What is claimed is:

1. A method, comprising:
receiving, by an Internet of Things (IoT) gateway device and from a first personal area network (PAN) device of a plurality of PAN devices that form a mesh network in a monitored site, positioning information associated with a second PAN device of the plurality of PAN devices, wherein each of the plurality of PAN devices is affixed to a respective sign, further wherein the first PAN device receives the positioning information over one or more hops across the mesh network from an intermediary PAN device of the plurality of PAN devices;
generating, by the IoT gateway device, site monitoring information by aggregating the positioning information with other positioning information received from the plurality of PAN devices, wherein the site monitoring information is indicative of a physical change in placement of a sign to which the second PAN device is affixed and of a signage type of the sign, further wherein the signage type is selected from the group consisting of: a danger sign, a caution sign, a registration number plate, and a notice sign; and
sending, by the IoT gateway device, the site monitoring information to a signage monitoring device that is configured to perform a mitigation action for the monitored site based on an identification of the physical change in placement of the sign and the signage type of the sign.

2. The method of claim 1, wherein the monitored site is a telecommunications carrier site that includes a communications tower, the communications tower operated by a telecommunications carrier.

3. The method of claim 1, wherein the second PAN device is not in direct communication range of the IoT gateway device.

4. The method of claim 1, wherein the positioning information includes information that is selected from the group consisting of: a geolocation of the second PAN device, a perimeter zone of the second PAN device, a distance from the second PAN device to a communications tower, and a cell lifetime of the second PAN device.

5. The method of claim 1, wherein each of the plurality of PAN devices is a sensor dot that is affixed to the respective sign using a bonding base with an instant bonding threshold.

6. The method of claim 1, wherein the second PAN device includes at least one sensor used to generate the positioning information, wherein the at least one sensor is selected from the group consisting of: a tilt sensor, an inclinometer, a dust sensor, a vibration sensor, and a global positioning satellite (GPS) sensor.

7. The method of claim 1, wherein the first PAN device comprises a mesh Bluetooth Low Energy device.

8. An apparatus, comprising:
  one or more network interfaces to communicate with a plurality of personal area network (PAN) devices that form a mesh network in a monitored site;
  a processor coupled to the network interfaces and configured to execute one or more processes; and
  an apparatus memory configured to store a process executable by the processor, the process when executed operable to:
    receive, from a first PAN device of the plurality of PAN devices, positioning information associated with a second PAN device of the plurality of PAN devices, wherein each of the plurality of PAN devices is affixed to a respective sign, further wherein the first PAN device receives the positioning information over one or more hops across the mesh network from an intermediary PAN device of the plurality of PAN devices;
    generate site monitoring information by aggregating the positioning information with other positioning information received from the plurality of PAN devices, wherein the site monitoring information is indicative of a physical change in placement of a sign to which the second PAN device is affixed and of a signage type of the sign, further wherein the signage type is selected from the group consisting of: a danger sign, a caution sign, a registration number plate, and a notice sign; and
    send the site monitoring information to a signage monitoring device that is configured to perform a mitigation action for the monitored site based on an identification of the physical change in placement of the sign and the signage type of the sign.

9. The apparatus of claim 8, wherein the monitored site is a telecommunications carrier site that includes a communications tower, the communications tower operated by a telecommunications carrier.

10. The apparatus of claim 8, wherein the second PAN device is not in direct communication range of the apparatus.

11. The apparatus of claim 8, wherein the positioning information includes information that is selected from the group consisting of: a geolocation of the second PAN device, a perimeter zone of the second PAN device, a distance from the second PAN device to a communications tower, and a cell lifetime of the second PAN device.

12. The apparatus of claim 8, wherein each of the plurality of PAN devices is a sensor dot that is affixed to the respective sign using a bonding base with an instant bonding threshold.

13. The apparatus of claim 8, wherein the second PAN device includes at least one sensor used to generate the positioning information, wherein the at least one sensor is selected from the group consisting of: a tilt sensor, an inclinometer, a dust sensor, a vibration sensor, and a global positioning satellite (GPS) sensor.

14. A tangible, non-transitory, computer-readable medium storing program instructions that cause a device in communication with a plurality of personal area network (PAN) devices that form a mesh network in a monitored site to execute a process comprising:
  receiving, from a first PAN device of the plurality of PAN devices, positioning information associated with a second PAN device of the plurality of PAN devices, wherein each of the plurality of PAN devices is affixed to a respective sign, further wherein the first PAN device receives the positioning information over one or more hops across the mesh network from an intermediary PAN device of the plurality of PAN devices;
  generating site monitoring information by aggregating the positioning information with other positioning information received from the plurality of PAN devices, wherein the site monitoring information is indicative of a physical change in placement of a sign to which the second PAN device is affixed and of a signage type of the sign, further wherein the signage type is selected from the group consisting of: a danger sign, a caution sign, a registration number plate, and a notice sign; and
  sending the site monitoring information to a signage monitoring device that is configured to perform a mitigation action for the monitored site based on an identification of the physical change in placement of the sign and the signage type of the sign.

* * * * *